(12) United States Patent
Reiner (10) Patent No.: US 8,443,157 B1
(45) Date of Patent: May 14, 2013

(54) DATA STORAGE SYSTEM HAVING ASSOCIATED SITUATIONAL ANALYSIS FRAMEWORK FOR AUTOMATIC RESPONSE TO MOVEMENT IN A STATE SPACE

(75) Inventor: David Stephen Reiner, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 537 days.

(21) Appl. No.: 12/639,668

(22) Filed: Dec. 16, 2009

(51) Int. Cl.
*G06F 12/00* (2006.01)

(52) U.S. Cl.
USPC .................................. 711/154; 711/E12.002

(58) Field of Classification Search .................. 711/154, 711/156, E12.002
See application file for complete search history.

(56) References Cited

U.S. PATENT DOCUMENTS

| | | | | |
|---|---|---|---|---|
| 7,159,081 | B2 * | 1/2007 | Suzuki | 711/154 |
| 7,313,659 | B2 * | 12/2007 | Suzuki | 711/154 |
| 2006/0059548 | A1 * | 3/2006 | Hildre et al. | 726/9 |
| 2009/0271589 | A1 | 10/2009 | Karpoff et al. | |
| 2009/0327011 | A1 * | 12/2009 | Petroff | 705/8 |

OTHER PUBLICATIONS

David Stephen Reiner, Ph.D. Dissertation, "A Method for Adaptive Performance Improvement of Operating Systems," The University of Wisconsin—Madison, 1980, No. 80-23427, 185 pages.

David Reiner et al., "A Method for Adaptive Performance Improvement of Operating Systems," ACM Sigmetrics Conference on Measurement and Methodology of Computer Systems, Sep. 1981, pp. 2-10.

U.S. Appl. No. 12/494,622 filed in the name of Dean D. Throop et al. on Jun. 30, 2009 and entitled "Facilitating Data Migration Between Tiers."

* cited by examiner

*Primary Examiner* — Pierre-Michel Bataille
(74) *Attorney, Agent, or Firm* — Ryan, Mason & Lewis, LLP

(57) ABSTRACT

The operation of a data storage system is controlled by determining dimensions of a situational state space characterizing operating conditions of the data storage system, associating policy sets with respective states of the state space, monitoring system operation in the state space, selecting a particular one of the policy sets based on an identified current state in the state space, and controlling the operation of the system in accordance with the selected policy set. These operations are performed by a processing device incorporated in or otherwise associated with the system, with the processing device implementing a situational analysis framework comprising a learning module coupled to a production module. The situational analysis framework may be part of a policy engine. The dimensions of the situational state space in an illustrative embodiment may comprise two or more dimensions selected from one or more dimension categories such as load, performance, time and event state.

20 Claims, 6 Drawing Sheets

DATA STORAGE SYSTEM HAVING ASSOCIATED SITUATIONAL ANALYSIS FRAMEWORK FOR AUTOMATIC RESPONSE TO MOVEMENT IN A STATE SPACE

FIELD OF THE INVENTION

The present invention relates generally to the field of data storage, and more particularly to techniques for operating a data storage system.

BACKGROUND OF THE INVENTION

A wide variety of different types of data storage systems are known, including, by way of example, tiered storage systems, cloud storage systems and storage systems of virtual data centers. These and other data storage systems typically comprise one or more sets of storage devices, also referred to as storage arrays.

Enterprise application users and other users generally want to achieve targeted performance levels and predictability from their data storage systems. However, under certain conditions these goals can be difficult to achieve in practice. For example, data storage systems are typically designed to include multiple tuning mechanisms that allow administrators to make adjustments to storage policies, parameters, thresholds, configurations, algorithms, and other characteristics of system operation. Although these low-level tuning mechanisms can be very helpful, they can also present a challenge to administrators in terms of understanding the impact of various choices and the interactions among the various choices as situations change over time. The result is that choices are often avoided, or made arbitrarily, or without knowledge of the likely effects. Tuning mechanisms that might help are not even activated through lack of knowledge of best practices and of the current situational requirements. Unfortunately, this can lead to sub-optimal or unpredictable system performance.

Administrators therefore have to become experts at setting storage policies, choosing parameters, tweaking configurations, and understanding interactions among policies. Nonetheless, it remains difficult to adjust to changing workloads, missed performance targets, fluctuating performance, and sudden demands on system resources, and total cost of operation increases significantly due to the expertise and attention required of administrative personnel.

Accordingly, a need exists for a data storage system that provides automated management across multiple policies, parameters, thresholds, configurations, algorithms or other characteristics of system operation in the presence of changing situations, so as to improve system performance and to avoid the need for system administrators to become experts at low-level tuning mechanisms.

SUMMARY OF THE INVENTION

Illustrative embodiments of the present invention overcome the above-described deficiencies of conventional practice by providing a situational analysis framework for automatic response to changing situations in a data storage system.

In accordance with an aspect of the invention, the operation of a data storage system is controlled by determining dimensions of a situational state space characterizing operating conditions of the data storage system, associating policy sets with respective states of the state space, monitoring system operation in the state space, selecting a particular one of the policy sets based on an identified current state in the state space, and controlling the operation of the system in accordance with the selected policy set. These operations are performed by a processing device incorporated in or otherwise associated with the system, with the processing device implementing a situational analysis framework comprising a learning module coupled to a production module. The situational analysis framework may be part of a policy engine, but could instead be implemented in another system component. The dimensions of the situational state space in an illustrative embodiment may comprise two or more dimensions selected from at least one dimension category. Examples of possible dimension categories include load, performance, time and event state.

An exemplary learning process implemented in the learning module may involve, for example, determining an initial partitioning of the state space into states, determining an objective function, identifying candidate policy sets with respect to the state space, selecting a particular one of the policy sets, deploying the selected policy set and evaluating the objective function, repeating the selecting and deploying steps until a specified criterion is met, and identifying an optimal policy set for each of the states of the state space. The specified criterion may be obtaining sufficient statistical information across the defined state space. The state space may be repartitioned and the learning process repeated until a specified criterion is met for the repartitioned space.

The illustrative embodiments advantageously overcome the above-noted drawbacks of conventional approaches that require administrators to use low-level tuning mechanisms to adapt to changing situations. For example, the situational analysis framework of the illustrative embodiments improves achievement of performance targets while reducing operating costs attributable to system administration. Improvements may also or alternatively be provided in other aspects of data storage system operation that are included in the objective function, such as power consumption, security, etc.

These and other features and advantages of the present invention will become more readily apparent from the accompanying drawings and the following detailed description.

DETAILED DESCRIPTION

The present invention will be described herein with reference to exemplary data storage systems and associated policy engines, hosts, managers and other processing devices. It is to be appreciated, however, that the invention is not restricted to use with the particular illustrative system and device configurations shown. Moreover, the term "data storage system" as used herein is intended to be broadly construed, so as to encompass, for example, tiered storage systems, cloud storage systems and storage systems of virtual data centers, as well as other types of systems comprising one or more storage devices.

Figure 1:
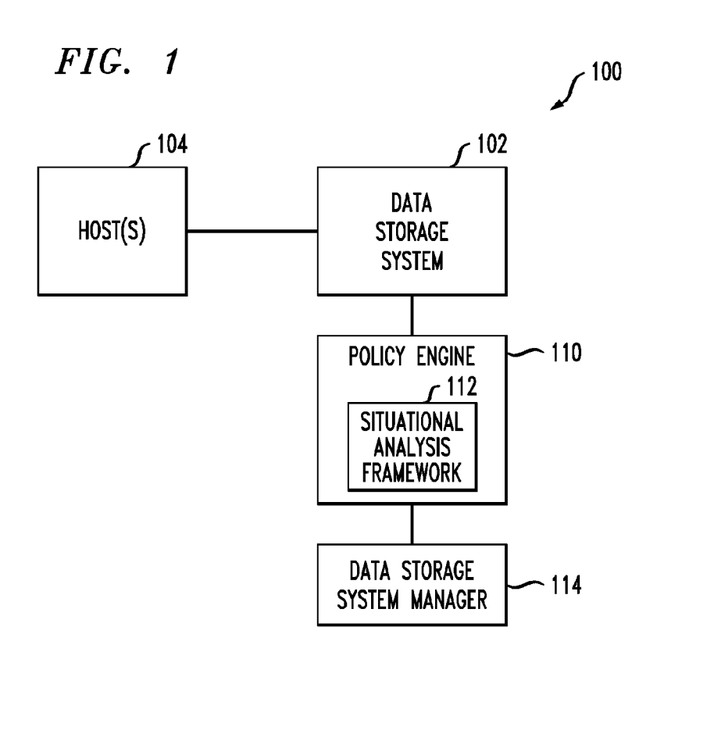
FIG. 1 is a block diagram showing one example of a processing system comprising a data storage system in an illustrative embodiment of the invention.

FIG. 1 shows an example of an information management system 100 which includes a data storage system 102, one or more hosts 104, and a policy engine 110 that incorporates a situational analysis framework (SAF) 112. The policy engine 110 is coupled between the data storage system 102 and a data storage system manager 114. The situational analysis framework 112 of the policy engine 110 is used to provide an automatic response to changing situations in the data storage system 102, as will be described in greater detail below.

Although the policy engine 110 is shown as being external to the data storage system 102 in the present embodiment, in other embodiments the policy engine may be internal to the data storage system. An example of an embodiment of this type will be described in conjunction with FIGS. 6 and 7.

Also, although the situational analysis framework 112 in the present embodiment is illustratively shown as being implemented within the policy engine 110, in other embodiments it could instead be implemented outside of the policy engine, in another system component, or distributed across multiple system components. For example, at least a portion of the situational analysis framework may be implemented in one of the hosts 104, or in the data storage system manager 114. Generally, the situational analysis framework sets policies, and so may be external to the policy engine, which carries out policies.

The data storage system 102 may comprise, for example, a single-site storage system comprising one or more storage arrays, servers, or other components. Alternatively, the system may comprise a distributed storage system comprising storage arrays, servers or other components not located at a single site but accessible via a network such as the Internet. The latter type of arrangement may be implemented as a so-called "cloud" storage system. A particular storage array, server or other component of the system 102 may thus be implemented as a computer or other stand-alone processing platform, or may be distributed over multiple processing platforms each comprising one or more separate computers.

Numerous other arrangements of storage arrays, servers or other components are possible in the data storage system 102. Such components can communicate with other elements of the information management system 100 over any type of network, such as a wide area network (WAN), a local area network (LAN), a satellite network, a telephone or cable network, or various portions or combinations of these and other types of networks.

The situational analysis framework 112 typically runs on a computer or other processing platform, which may be viewed as an example of what is more generally referred to herein as a "processing device." Such a device generally comprises at least one processor and an associated memory, and implements functional modules for controlling some aspects of the data storage system 102.

It is to be appreciated that a given embodiment of the system 100 may include multiple instances of data storage system 102, policy engine 110, situational analysis framework 112, and manager 114, although only single instances of such components are shown in the simplified system diagram for clarity of illustration.

Figure 2:
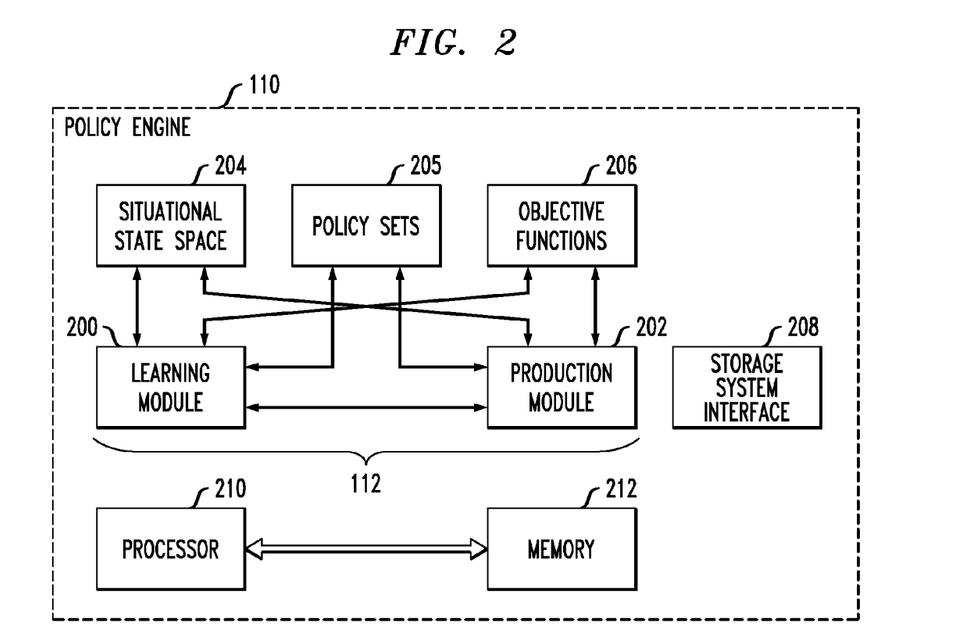
FIG. 2 is a more detailed view of a policy engine comprising a situational analysis framework in the FIG. 1 system.

FIG. 2 shows a more detailed view of the policy engine 110 in an illustrative embodiment. The situational analysis framework 112 of the policy engine 110 in this embodiment comprises a learning module 200 coupled to a production module 202. Other components of the situational analysis framework 112 include situational state space 204, policy sets 205, and objective functions 206. The operations of the learning module and production module will be described below in conjunction with FIGS. 3A and 3B, respectively. The learning module and the production module both have access to the situational state space 204, policy sets 205, and objective functions 206. The policy engine 110 interfaces with the data storage system 102 and the data storage system manager 114 via the storage system interface 208.

The policy engine 110 in this embodiment further comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The learning and production modules 200 and 202 of the policy engine 110 may be implemented in whole or in part in the form of one or more software programs stored in memory 212 and executed by processor 210.

The memory 212 may be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device implementing the situational analysis framework 112 causes the device to perform corresponding operations associated with functions such as automatic policy selection for controlling operation of the data storage system 102. Similarly, computer program code may be used to implement other functionality associated with the policy engine 110, such as carrying out policies selected by the situational analysis framework 112. One skilled in the art would be readily able to implement such software given the teachings provided herein. Other examples of computer program products embodying aspects of the invention may include, for example, optical or magnetic disks.

It should be noted that the policy engine 110 may comprise other modules or components in addition to those specifically shown in FIG. 2. For example, conventional modules of a type known to those skilled in the art may be incorporated into the policy engine.

Figure 3A:
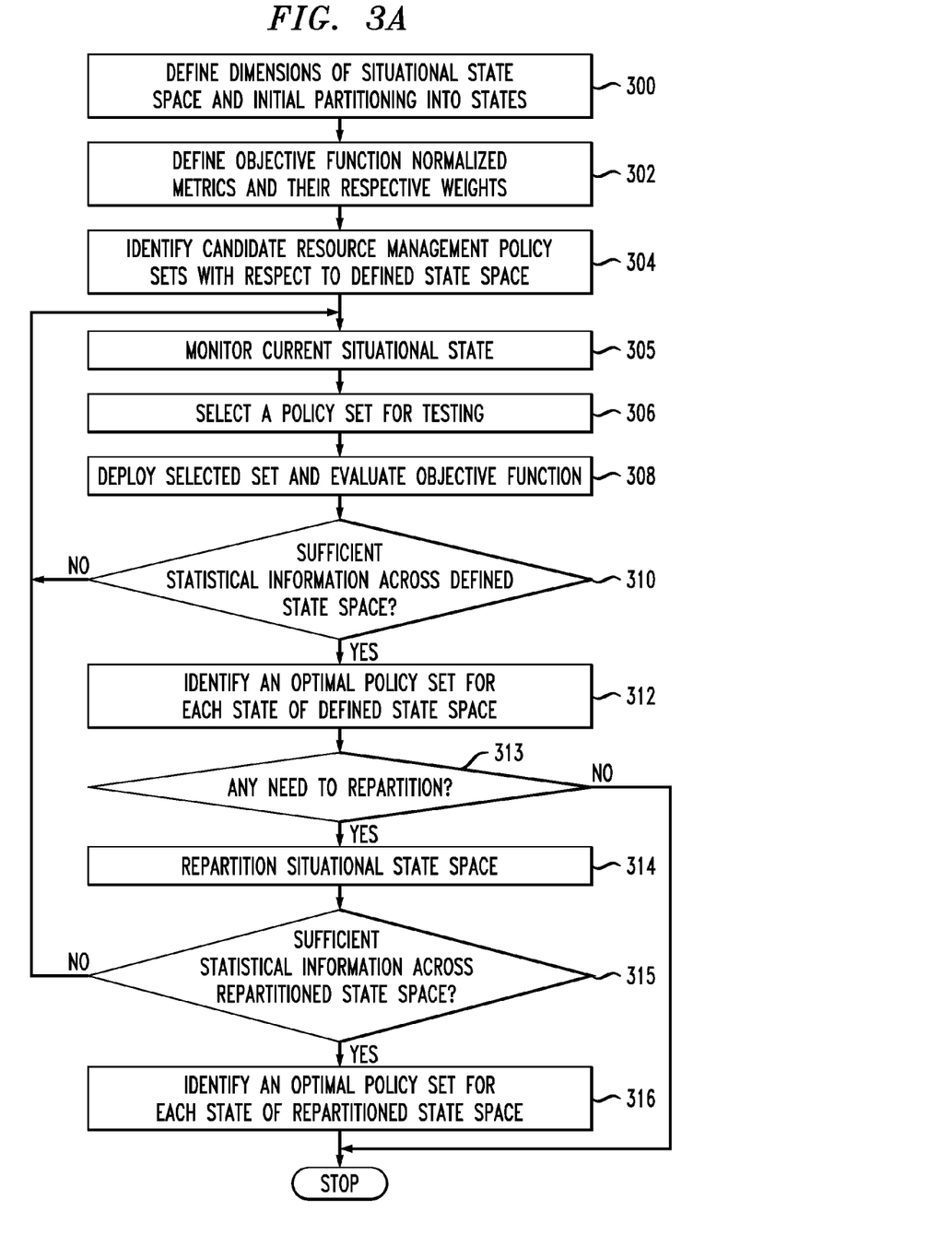
FIGS. 3A and 3B are flow diagrams illustrating the operation of respective learning and production modules of the situational analysis framework in the FIG. 1 system.

Referring now to FIG. 3A, a flow diagram illustrating the operation of the learning module 200 of the situational analysis framework 112 is shown. The learning process implemented by this module includes steps 300 through 316.

Figure 4A:
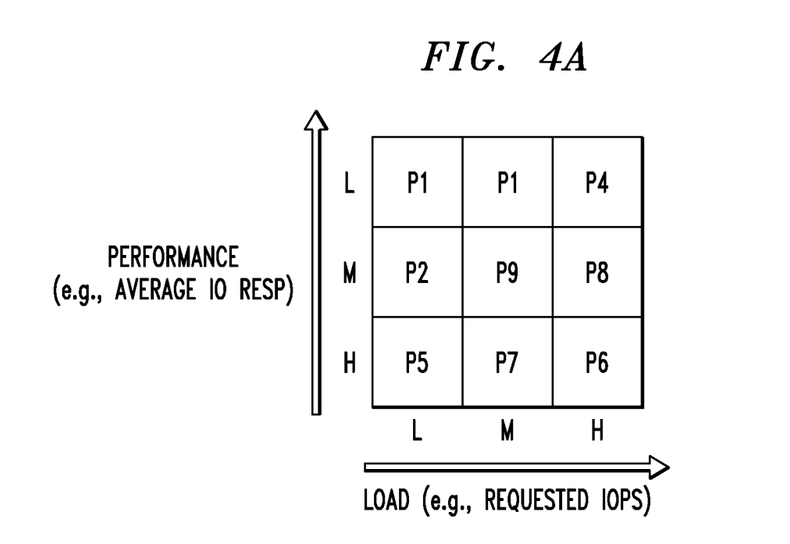
FIG. 4A shows an example of a situational state space having dimensions selected from respective categories of load and performance, and having selected policy sets for respective states.
Figure 4B:
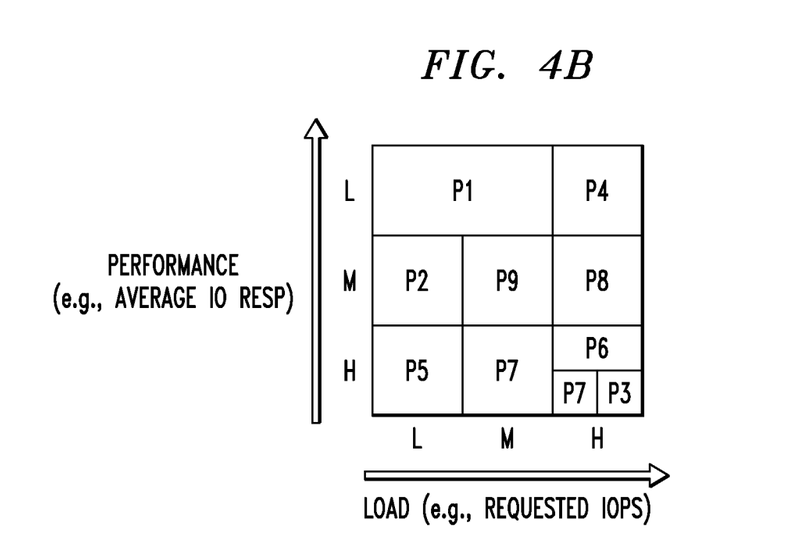
FIG. 4B illustrates how the situational state space of FIG. 4A may be repartitioned and modified by operation of the learning module of the situational analysis framework.
Figure 5:
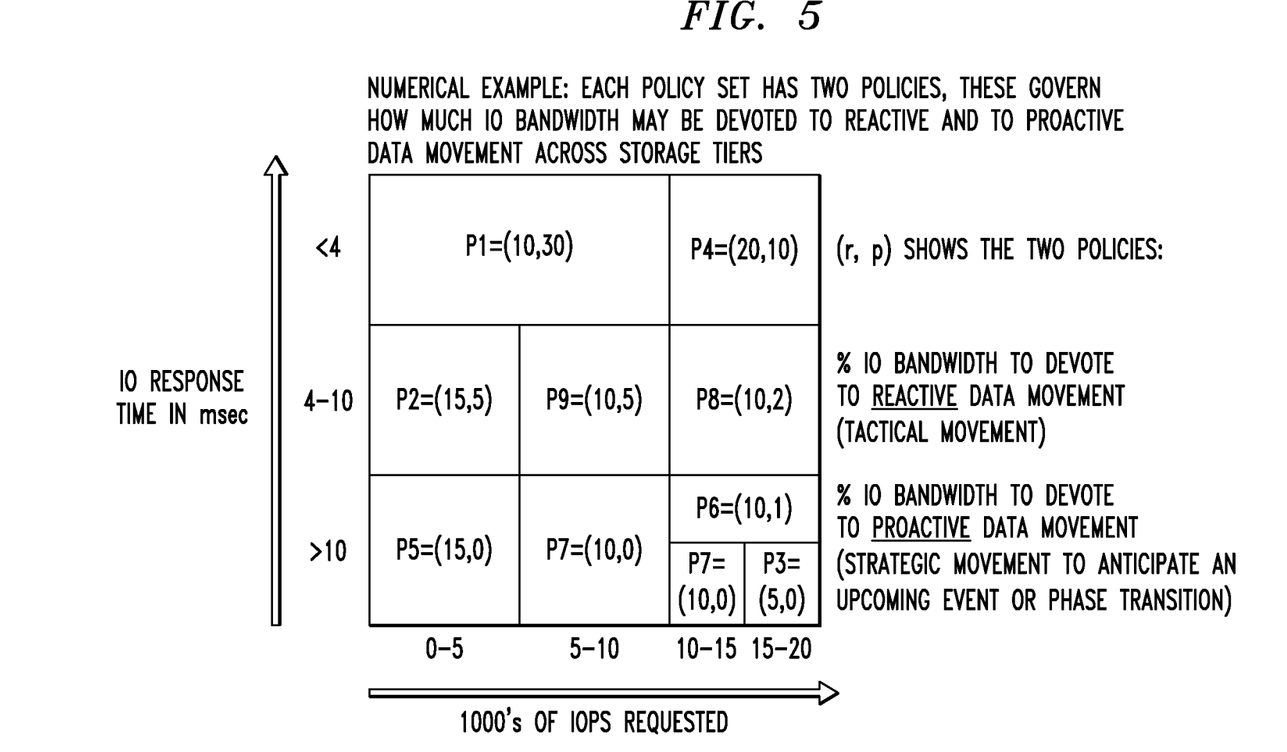
FIG. 5 shows a more detailed numerical example of policy sets that may be associated with the situational state space of FIG. 4B.

In step 300, the dimensions of a situational state space are defined, as well as an initial partitioning of the state space into states. The dimensions of the situational state space in an illustrative embodiment may comprise two or more dimensions selected from at least one dimension category. Examples of possible dimension categories include load, performance, time and event state. More particular illustrations of exemplary situational state spaces are shown in FIGS. 4A, 4B and 5. In these state spaces, there are two dimensions, one selected from the load category and the other selected from the performance category. In other embodiments, two or more dimensions may be selected from one or more of the categories. For example, other two dimensional state spaces may comprise two load dimensions or two performance dimensions. It is also possible for the defined state space to include only a single dimension, or three or more dimensions.

Figure 6:
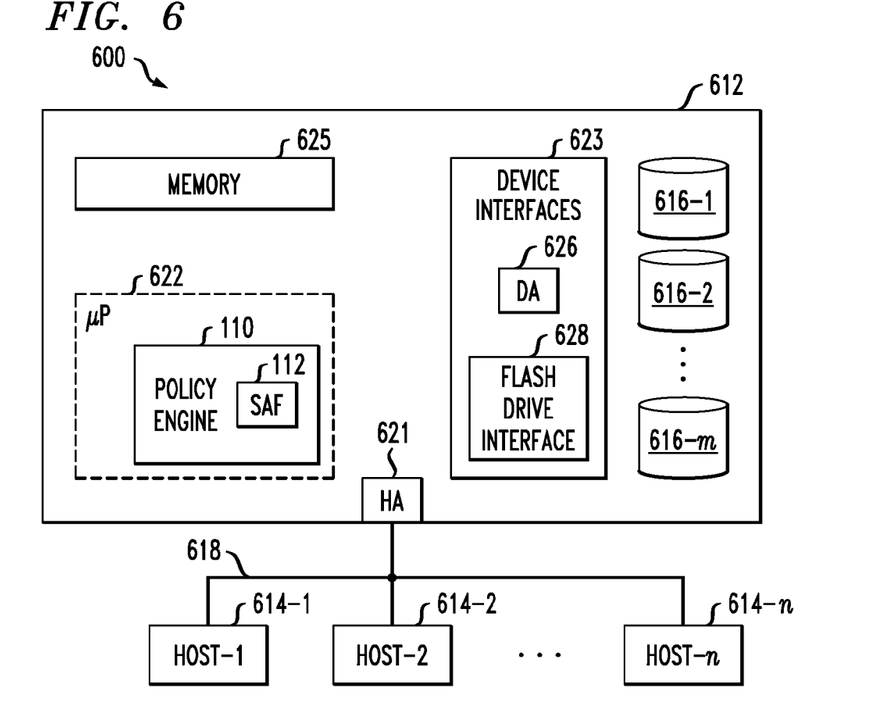
FIGS. 6 and 7 illustrate one possible implementation of the FIG. 1 system as a tiered storage system that incorporates the policy engine of FIG. 2.
Figure 7:
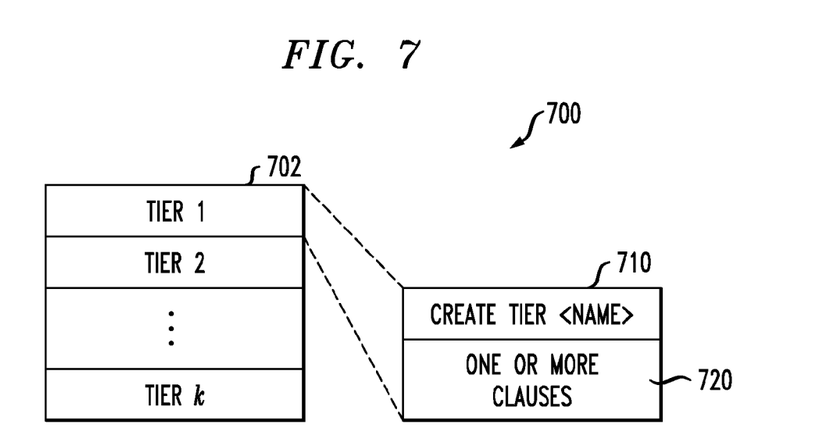

In step 302, objective function normalized metrics and their respective weights are defined. Examples of objective function metrics include response time, throughput, predictability and utilization. As a more particular example, the objective function may comprise a weighted sum of two normalized metrics, such as a storage level measure and an application level measure. In this case, a given objective function F may be defined as follows:

$$F=0.40(N1(MB/sec))+0.60(N2(transactions/sec))$$

where MB/sec denotes a local or storage level data transfer metric, transactions/second denotes an application level data transfer metric, and N1 and N2 denote normalization functions. As another example, an objective function suitable for use in a tiered data storage system may be as follows:

$$F=0.50(N3(\text{anticipation of 10 access patterns}))+0.50\\(N4(\text{data movement effectiveness}))$$

where the two constituent metrics in this case are performance metrics of the tiered data storage system, and N3 and N4 denote normalization functions. An embodiment of the invention implemented in a tiered data storage system will be described in greater detail below in conjunction with FIGS. 6 and 7. Of course, numerous other objective functions may be used in implementing the present invention, and the particular metrics and weights will generally vary depending on factors such as the aspects of data storage system operation of interest, the type of data storage system, the system configuration, the applications running on the system, etc. For example, in place of the above-noted application level measure, one could more generally use any potentially optimizable measure outside of the data storage system.

Examples of other performance metrics that may be used in a given objective function include input outputs per second (IOPS), average service time (AST), average response time (ART), performance service level objective (SLO) achievement, availability SLO achievement, consistency of input output (IO) response times (i.e., predictability), utilization, etc.

In step 304, candidate resource management policy sets are identified with respect to the defined state space. An example of a defined state space is shown in FIG. 4A, where a defined state space having load and performance dimensions is partitioned into nine states. The load dimension in this example may be requested IOPS, and the performance dimension may be average IO response, both segmented into ranges of low (L), medium (M) and high (H). The candidate policy sets identified in step 304 are not shown explicitly in FIG. 4A, but are assumed to include at least nine distinct policy sets denoted P1 through P9.

Each of the policy sets may comprise at least first and second policies, with each such policy being specified by at least a value of a particular operating parameter. For example, the first and second policies of a given one of the policy sets may comprise respective values defining respective percentages of a specified resource to be used for reactive and proactive data movement within the data storage system. As a more particular example, the two policies of each policy set may be given by respective values r and p, where r denotes the percentage of IO bandwidth to devote to reactive data movement across storage tiers in a tiered data storage system, and p denotes the percentage of IO bandwidth to devote to proactive data movement across tiers in the tiered storage system.

In step 305, the current situational state of the data storage system 102 is monitored. Generally, as the system operates, its state will change over time. This step monitors the trajectory of system operation over time and determines the current state of operation in the defined state space.

In step 306, a particular one of the candidate policy sets identified in step 304 is selected for testing for use with the current state as determined in step 305. The selected policy set is then deployed and the objective function is subsequently evaluated, as indicated in step 308.

Step 310 then determines if sufficient statistical information has been obtained across the defined state space. For example, this determination may be based on a value of a indicating a level of statistical significance of differences in objective function values across candidate policy sets. More particularly, a value of a less than a certain value, such as 0.1 corresponding to a 90% level of statistical significance or 0.2 corresponding to an 80% level of statistical significance, may be used to indicate that sufficient statistical information has been obtained. In other embodiments, one or more additional or alternative criteria may be used as a basis for the decision in step 310. If sufficient statistical information has been obtained, the process moves to step 312, and otherwise returns to step 305.

In step 312, an optimal policy set is identified for each state of the defined state space. With reference again to the FIG. 4A example, it was assumed above that the candidate policy sets identified in step 304 included at least nine distinct policy sets denoted P1 through P9. After performance of step 312, eight policy sets denoted P1, P2, P4, P5, P6, P7, P8 and P9 are associated with particular ones of the states, with policy set P1 being used for two states and policy set P3 not being used for any state. This step of identifying optimal policy sets may be performed, by way of example, using a process based on Bayesian principles, a Taguchi judgmental sampling process, or other type of known optimization process. Examples of Bayesian optimization techniques are disclosed in W. M. Bolstad, "Introduction to Bayesian Statistics," Second Edition, John Wiley, 2007, ISBN 0-471-27020-2. Examples of Taguchi judgmental sampling techniques are disclosed in N. Logothetis and H. P. Wynn, "Quality Through Design Experimental Design, Off-line Quality Control, and Taguchi's Contributions," Oxford University Press, Oxford Science Publications, 1989, ISBN 0-19-851993-1; and R. D. Moen, T. W. Nolan & L. P. Provost, "Improving Quality Through Planned Experimentation," 1991, ISBN 0-07-042673-2.

In step 313, a determination is made as to whether or not there is a need to repartition the situational state space. For example, there may be a need to repartition the state space in order to combine multiple states into a single state based on the policy sets associated with these multiple states, or to divide a single state associated with a sensitive area into multiple states for more precision in choosing policy sets. If there is no such need, the process stops as indicated, and otherwise proceeds to step 314. The repartitioning need determination in step 313 may be based on satisfaction of predetermined repartitioning criteria.

In step 314, the situational state space is repartitioned, and the availability of sufficient statistical information is again tested in step 315. If there is not sufficient statistical information across the repartitioned state space, the process returns to step 305 to select and deploy policy sets and evaluate the objective function for each such selected and deployed set until sufficient statistical information is available across the repartitioned state space. An optimal policy set is then identified for each state of the repartitioned state space in step 316.

With reference to FIG. 4B, an example of a repartitioned state space is shown. Relative to the state space of FIG. 4A, the repartitioned state space of FIG. 4B has separated the state formerly associated with policy set P6 into three separate states now associated with respective policy sets P3, P6 and P7. Also, the two states formerly associated with policy set P1 in FIG. 4A have been combined into a single state in the repartitioned state space of FIG. 4B. The repartitioning of the state space in step 314 may be performed using an automated mesh refinement process, although other repartitioning techniques may also or alternatively be used. Examples of automated mesh refinement techniques suitable for use with embodiments of the invention are disclosed in "Theory and Applications: Proceedings of the Chicago Workshop on Adaptive Mesh Refinement Methods," Sep. 3-5, 2003, Series: Lecture Notes in Computational Science and Engineering, Vol. 41, T. Plewa, T. Linde & V. G. Weirs (Eds.), Springer-Verlag, 2005, ISBN 978-3-540-21147-1.

Although not specifically indicated in the FIG. 3A diagram, the repartitioning process may be repeated one or more additional times, each time resulting in a repartitioned state space having optimal policy sets associated with its respective states.

Figure 3B:
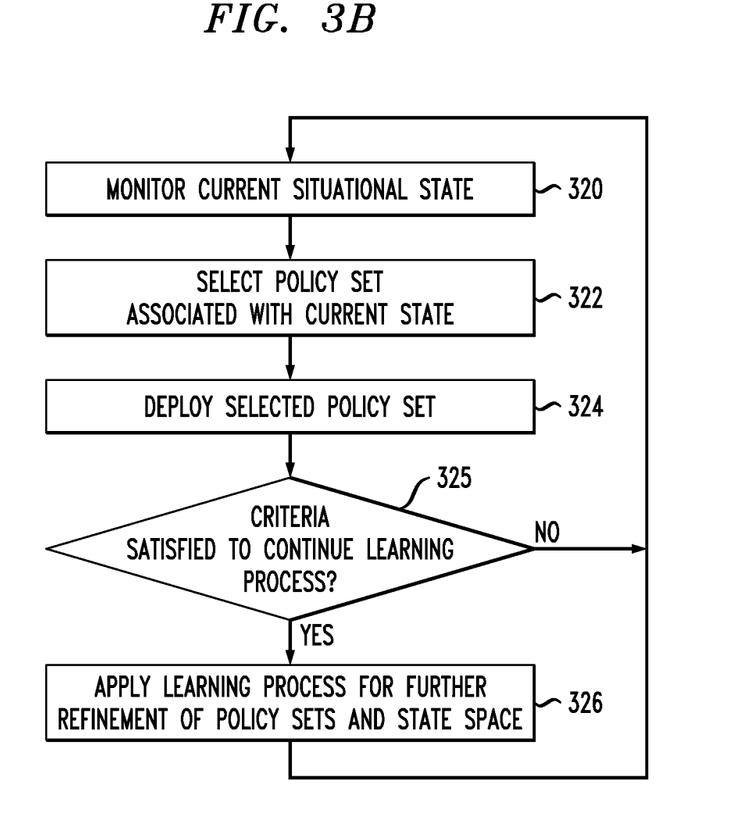

FIG. 3B is a flow diagram illustrating the operation of the production module 202 of the situational analysis framework 112. The production process implemented by this module includes steps 320 through 326.

In step 320, the process monitors the current situational state of the system in the defined situational state space. This situational state space will generally be a repartitioned state space determined through prior use of the learning process of FIG. 3A.

In step 322, a particular policy set is selected based on the current state in the state space as determined in step 320.

In step 324, the selected policy set is deployed.

With reference to the FIG. 5 example, the repartitioned state space is shown, with each of the states of the state space being associated with a policy set comprising a pair of policies specified by (r, p), where as noted previously r is the first policy and denotes the percentage of IO bandwidth to devote to reactive data movement and p is the second policy and denotes the percentage of IO bandwidth to devote to proactive data movement. Reactive data movement generally refers to tactical movement of data across storage tiers, while proactive data movement generally refers to strategic movement of data across storage tiers to anticipate an upcoming event or phase transition.

Based on the current state in this particular state space, the production module 202 will select and deploy the corresponding policy set. By way of example, if the IO response time in milliseconds (ms) is in the range from 4-10 and the number of TOPS requested is in the range from 5,000 to 10,000, the production module will select and deploy policy set P9=(10, 5), meaning that the data storage system 102 will be controlled such that r=10 and p=5. Thus, 10% of the 10 bandwidth will be devoted to reactive data movement, and 5% of the IO bandwidth will be devoted to proactive data movement. It is understood that the remaining IO bandwidth will be devoted to satisfying application IO requests.

Steps 320 through 324 are generally repeated on an ongoing basis, as the system operating point moves within the defined state space. Thus, the process after completing step 324 returns to step 320 for further monitoring. At this time, the process also enters step 325 as indicated.

In step 325, a determination is made as to whether specified criteria for continuing the learning process have been satisfied. For example, the learning process may be repeated periodically based on expiration of timers, or may be repeated based on other specified system triggers or event occurrences. If these criteria are not satisfied, the process returns to step 320.

In step 326, at least a portion of the learning process of FIG. 3A is applied for further refinement of the policy sets and the state space. Thus, for example, policy sets not previously deemed optimal may be deployed in one or more states of the state space used in steps 320 and 322 to observe the effects of these policy sets on the objective function. Or, for example, the state space used in steps 320 and 322 may be subject to further repartitioning and further determination of optimal policy sets for assignment to respective repartitioned states. The learning process may thus continue in the background of the monitoring, selecting and deploying steps 320-324.

It should be noted that the particular process steps shown in the flow diagrams of FIGS. 3A and 3B are presented by way of illustrative example only, and should not be construed as limiting the scope of the invention in any way.

For example, alternative embodiments could utilize other learning and production processes to associate optimal policy sets with respective states of a situational state space determined for a data storage system, or to deploy these policy sets.

Also, hysteresis or "ping-ponging" among states may be reduced by delaying policy set deployment or redeployment for a specified interval of time.

Again by way of example, the process of FIGS. 3A and 3B could also be modified so as to be used periodically to propose a policy set deployment for human approval rather than automatically doing the deployment.

As yet another example, policy sets may also be modified externally to the situational analysis framework 112 (e.g., by a human or other program), and either a dimension of the state space may reflect this fact, or the result of the external modification may be a state transition that the production module may react to by deploying the appropriate policy set associated with that state.

FIG. 6 shows an information management system 600 which comprises a tiered data storage system 612. The policy engine 110 comprising situational analysis framework 112 as previously described is implemented in this embodiment within the tiered data storage system 612. The data storage system is connected to hosts 614-1, 614-2, . . . 614-n through communication medium 618. The hosts 614 may access the data storage system 612, for example, to perform data read or write requests or other IO operations. The communication medium 618 may be any one or more of a variety of networks or other types of communication connections, such as a network connection, bus or other type of data link, as known to those skilled in the art. For example, the communication medium 18 may be the Internet, an intranet, a Storage Area Network (SAN) or any other wired or wireless connection(s) by which the hosts 614 may access and communicate with the data storage system 612, and may also communicate with other components included in the system 600. Communications over the medium 618 may be in accordance with known protocols, such as Small Computer System Interface (SCSI), Fibre Channel (FC), Internet SCSI (iSCSI), etc.

The hosts 614 and data storage system 612 may all be located at the same physical site, or may be located at different physical sites. Each of the hosts 614 may perform different types of data operations in accordance with different types of tasks. For example, any one of the hosts 614 may issue a data request to the data storage system 612 to perform a data operation. More particularly, an application executing on one of the hosts 614 may perform a read or write operation resulting in one or more data requests to the data storage system 612.

Although system 612 is illustrated as a single data storage system, such as a single data storage array, element 612 may also represent, for example, multiple data storage arrays alone, or in combination with other data storage devices, systems, appliances, or other components having suitable connectivity, such as in a SAN, in an embodiment using the techniques herein. It should also be noted that an embodiment may include data storage arrays or other components from one or more vendors. For example, the data storage system 612 may be implemented as an otherwise conventional Symmetrix® DMX™ data storage array or a CLARiiON® data storage array commercially available from EMC Corporation of Hopkinton, Mass., suitably modified to implement the policy engine 110 comprising situational analysis framework 112. However, as will be appreciated by those skilled in the art, the techniques disclosed herein are applicable for use with other data storage arrays by other vendors and with other components than those expressly described herein for purposes of example.

The data storage system 612 comprises a plurality of data storage devices 616-1, 616-2, . . . 616-m, which may be associated with one or more storage arrays. The data storage devices may include one or more different types of data storage devices such as, for example, one or more disk drives, one or more solid state drives (SSDs), etc. Thus, the storage devices 616 may comprise flash memory devices employing one or more different flash memory technologies. In such an implementation, the data storage devices 616 may include a combination of disk devices and flash devices in which the flash devices may appear as standard FC disk drives to the various software tools used in connection with the data storage array. The disk devices may be any one or more different types of disk devices such as, for example, an advanced technology attachment (ATA) disk drive, FC disk drive, and the like. The flash devices may be constructed using different types of memory technologies such as nonvolatile semiconductor NAND flash memory forming one or more SLC (single level cell) devices or MLC (multi level cell) devices. Flash memory devices and disk devices are two exemplary types of storage devices 616 that may be included in a data storage system used in connection with the techniques described herein.

The hosts 614 need not directly address the storage devices 616, but instead access to stored data may be provided to one or more of the hosts from what those hosts view as a plurality of logical units (LUs). The LUs may or may not correspond to the actual physical storage devices 616. For example, one or more LUs may reside on a single physical drive or multiple drives, or on a variety of subsets of multiple drives. Data in a single data storage system, such as a single data storage array, may be accessed by multiple hosts allowing the hosts to share the data residing therein. A map maintained by the data storage system may associate host logical address with physical device address.

The data storage system 612 in the present embodiment further comprises a host adaptor (HA) 621 coupled to the hosts 614 via the communication medium 618, a microprocessor (µP) 622, device interfaces 623, and a memory 625. The policy engine 110 and its situational analysis framework 112 are implemented in this embodiment in software running on the microprocessor 622. The device interfaces 623 comprise at least one device adaptor (DA) 626 and at least one flash drive interface 628. The memory 625 may include separate portions for global memory and local memory.

As indicated above, the data storage system 612 may be made up of a variety of different types of storage devices 616, and such devices typically have different performance characteristics. For example, the storage devices may exhibit different average service time or average response time for servicing IO requests, different utilization of system resources, or other types of differing performance characteristics.

Given the different performance characteristics of the storage devices 616, one or more tiers of storage devices are defined, as illustrated in FIG. 7. In this embodiment, a tiered storage array 700 implemented using at least a subset of the storage devices 616 comprises k different tiers denoted Tier 1, Tier 2, . . . Tier k. These tiers may correspond, for example, to respective ones of the storage devices 616. Each such tier may be created by specifying a tier definition 710 including a tier name and one or more clauses 720. The tier definition 710 may include one or more lines of text in a language which may be subsequently processed by code on the data storage system. The tier definition 710 defines a tier indicated by <NAME>. The tier clauses 720 may include one or more goal clauses, one or more configuration clauses, or other types of clauses, in any combination.

The separation of the storage devices 616 into tiers may be based on the performance characteristics of the devices, with similar performing devices being grouped together within a particular tier. In other embodiments, the particular performance characteristics may be applied to a storage pool with or without the definition of tiers. That is, the system may group devices within a storage pool by their characteristics with or without explicitly creating a set of tiers and may instead utilize an alternative method of creating a hierarchy based on the performance characteristics of the storage devices.

In operation, the data storage system 612 is configured to deploy selected policy sets for migrating data across the various tiers, based on the current state of the system within the defined situational state space. For example, policy sets may be associated with respective states of a situational state space in the manner illustrated in FIG. 5, with each policy set including two policies specified by the values of respective reactive and proactive variables r and p. The policy sets are associated with the states of the state space by the learning module 200 of the policy engine 110 in the manner described in conjunction with FIG. 3A, and selected for use by the production module 202 of the policy engine 110 in the manner described in conjunction with FIG. 3B. The data migration implemented in data storage system 612 may involve, for example, migrating frequently-used or "hot" data to faster tiers and infrequently-used or "cold" data to slower tiers. Numerous other types of data migration, movement, copying, swapping, etc. may be implemented, proposed, or prevented in the tiered data storage system 612 using policies carried out by the policy engine 110 based on determinations made by the situational analysis framework 112.

The illustrative embodiments described herein provide a number of significant advantages over conventional techniques for adapting to changing situations in a data storage system. For example, these embodiments avoid the costs associated with requiring administrators to control multiple low-level tuning mechanisms. The situational analysis framework automatically determines appropriate policy sets for deployment based on monitoring system trajectory in a state space whose dimensions are selected from categories such as load, performance, time and event state. It brings ease-of-use without sacrificing performance and other management goals for storage arrays and other complex data storage system environments. The situational analysis framework of the illustrative embodiments therefore provides improved performance while reducing operating costs attributable to system administration.

As indicated above, functionality such as that described in conjunction with the flow diagrams of FIGS. 3A and 3B can be implemented at least in part in the form of one or more software programs stored in memory and executed by a processor of a processing device such as a policy engine, manager, host, controller or server. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of processing systems, data storage systems and processing devices. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
 a processing device having a processor coupled to a memory and configured to control operation of a data storage system;
 wherein the processing device is configured to determine dimensions of a situational state space characterizing operating conditions of the data storage system, to associate policy sets with respective states of the state space, to monitor system operation in the state space, to select a particular one of the policy sets based on an identified current state in the state space, and to control the operation of the system in accordance with the selected policy set.

2. The apparatus of claim 1 wherein at least a subset of the operations of the processing device are implemented in a situational analysis framework of the processing device and wherein said framework comprises a learning module coupled to a production module.

3. The apparatus of claim 2 wherein the learning module and the production module are implemented in a policy engine of the processing device.

4. The apparatus of claim 1 wherein the processing device is implemented within the data storage system.

5. The apparatus of claim 1 wherein the processing device is coupled between the data storage system and an external data storage system manager.

6. The apparatus of claim 1 wherein the data storage system comprises one of a tiered storage system, a cloud storage system and a storage system of a virtual data center.

7. A method of operating a data storage system, the method comprising the steps of:
 determining dimensions of a situational state space characterizing operating conditions of the data storage system;
 associating policy sets with respective states of the state space;
 monitoring system operation in the state space;
 selecting a particular one of the policy sets based on an identified current state in the state space; and
 controlling the operation of the system in accordance with the selected policy set;
 wherein the steps are performed by a processing device associated with the system, the processing device comprising a processor coupled to a memory.

8. The method of claim 7 wherein the steps are performed in a situational analysis framework of the processing device and wherein said framework comprises a learning module coupled to a production module.

9. The method of claim 8 wherein the learning module and the production module are implemented in a policy engine.

10. The method of claim 9 wherein at least said associating step is implemented in the learning module of the policy engine.

11. The method of claim 7 wherein said dimensions of the situational state space characterizing operating conditions of the data storage system comprise two or more dimensions selected from at least one dimension category, and said at least one dimension category comprises one or more of load, performance, time and event state.

12. The method of claim 7 wherein the associating step further comprises:
 determining an initial partitioning of the state space into states;
 determining an objective function;
 identifying candidate policy sets with respect to the state space;
 selecting a particular one of the policy sets with respect to a given state of the state space;
 deploying the selected policy set and evaluating the objective function;
 repeating the selecting and deploying steps until a specified criterion is met; and
 identifying an optimal policy set for each of the states of the state space.

13. The method of claim 12 wherein the objective function comprises a weighted function of a normalized storage level measure and a normalized application level measure.

14. The method of claim 12 wherein the step of identifying optimal policy sets is performed using at least one of a Bayesian optimization process and a Taguchi judgmental sampling process.

15. The method of claim 12 further comprising the steps of:
 repartitioning the state space;
 identifying candidate policy sets with respect to the repartitioned state space;
 selecting a particular one of the policy sets with respect to a given state of the state space;
 deploying the selected policy set and evaluating the objective function;
 repeating the selecting and deploying steps until a specified criterion is met; and
 identifying an optimal policy set for each of the states of the repartitioned state space.

16. The method of claim 15 wherein the repartitioning step is performed using an automated mesh refinement process.

17. The method of claim 15 wherein the steps applied to the repartitioned state space are further applied to at least one additional repartitioning of the state space.

18. The method of claim 7 wherein the policy sets each comprise at least first and second policies with each such policy being specified by at least a value of a particular operating parameter.

19. The method of claim 18 wherein the first and second policies of a given one of the policy sets comprise respective values defining respective percentages of a specified resource to be used for reactive and proactive data movement within the data storage system.

20. A computer program product comprising a processor-readable storage medium having encoded therein executable code of one or more software programs, wherein the one or more software programs when executed by the processor of the processing device implement the steps of the method of claim 7.

* * * * *